(12) United States Patent
Morton et al.

(10) Patent No.: US 7,900,655 B2
(45) Date of Patent: Mar. 8, 2011

(54) COMPOSITE LOAD TRANSFERRING TECHNIQUE

(75) Inventors: Joseph Alan Morton, Tulsa, OK (US); Jeffrey Monroe Wilson, Tulsa, OK (US); Dixit B. Kadakia, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 14 days.

(21) Appl. No.: 12/175,932

(22) Filed: Jul. 18, 2008

(65) Prior Publication Data

US 2010/0012215 A1    Jan. 21, 2010

(51) Int. Cl.
*F16L 55/16*    (2006.01)

(52) U.S. Cl. .................. 138/99; 249/90; 425/13; 425/14

(58) Field of Classification Search .............. 138/99; 249/90; 425/13, 14
See application file for complete search history.

(56) References Cited

U.S. PATENT DOCUMENTS

| | | | |
|---|---|---|---|
| 3,438,114 A | 4/1969 | Berman et al. | |
| 3,563,276 A * | 2/1971 | Hight et al. | 138/99 |
| 3,954,288 A * | 5/1976 | Smith | 285/93 |
| 4,417,459 A | 11/1983 | Tomita | |
| 4,589,562 A | 5/1986 | Fawley | |
| 4,756,337 A * | 7/1988 | Settineri | 138/99 |
| 5,301,983 A * | 4/1994 | Porowski | 285/10 |
| 5,345,972 A * | 9/1994 | Goglio et al. | 138/99 |
| 5,453,302 A | 9/1995 | Chaudhry et al. | |
| 5,677,046 A | 10/1997 | Fawley et al. | |
| 6,146,482 A | 11/2000 | Patton et al. | |
| 6,425,172 B1 | 7/2002 | Rutz | |
| 6,651,307 B2 | 11/2003 | Portmann | |
| 7,165,579 B2 | 1/2007 | Borland et al. | |
| 7,331,095 B2 | 2/2008 | Furchheim | |
| 7,387,138 B2 | 6/2008 | Rice et al. | |
| 7,472,722 B2 * | 1/2009 | Nadarajah et al. | 138/99 |
| 2002/0029449 A1 | 3/2002 | Portmann | |
| 2004/0129373 A1 * | 7/2004 | Nadarajah et al. | 156/94 |
| 2006/0118191 A1 * | 6/2006 | Rice | 138/99 |
| 2006/0162797 A1 * | 7/2006 | Boulet D'Auria et al. | 138/99 |
| 2006/0272724 A1 * | 12/2006 | Borland et al. | 138/99 |
| 2007/0107792 A1 * | 5/2007 | Rice et al. | 138/99 |

OTHER PUBLICATIONS

International Search Report and Written Opinion issued by the International Searching Authority (ISA/US) on Dec. 1, 2009 in corresponding application PCT/US09/49866; 10pgs.

* cited by examiner

*Primary Examiner* — James F Hook
(74) *Attorney, Agent, or Firm* — Gable Gotwals

(57) ABSTRACT

A method for repairing and reinforcing a pipeline includes covering a defect in a pipeline section with a composite wrap, isolating the wrap from the ambient environment, and applying a compressive force on the wrap so that the pressure on the wrap is substantially equal to the pipeline pressure. Isolating the wrap involves the use of a housing having a cavity that substantially conforms to the shape of the wrapped section. The cavity may contain a pressurized gas or liquid. Because the pressure acting on the surface of the wrap is at least substantially equal to the pressure of the pipeline section, the wrap cures as if the pipeline is at zero pressure. Once the wrap has effectively cured, the compressive force may be relieved and the housing removed. The composite is now under load and is immediately sharing load with the pipeline.

19 Claims, 4 Drawing Sheets

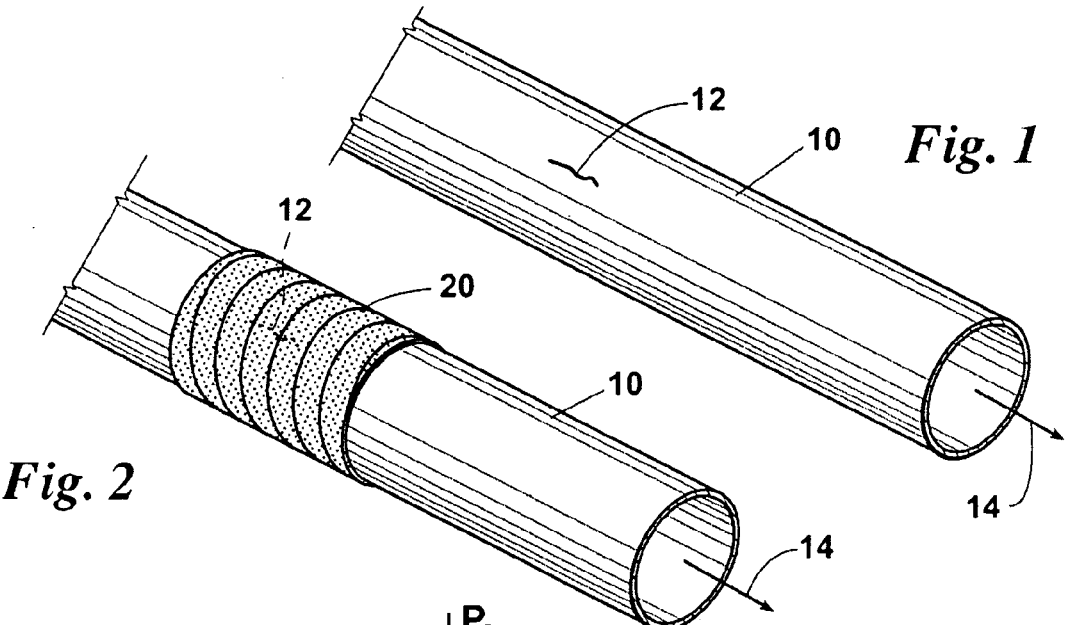
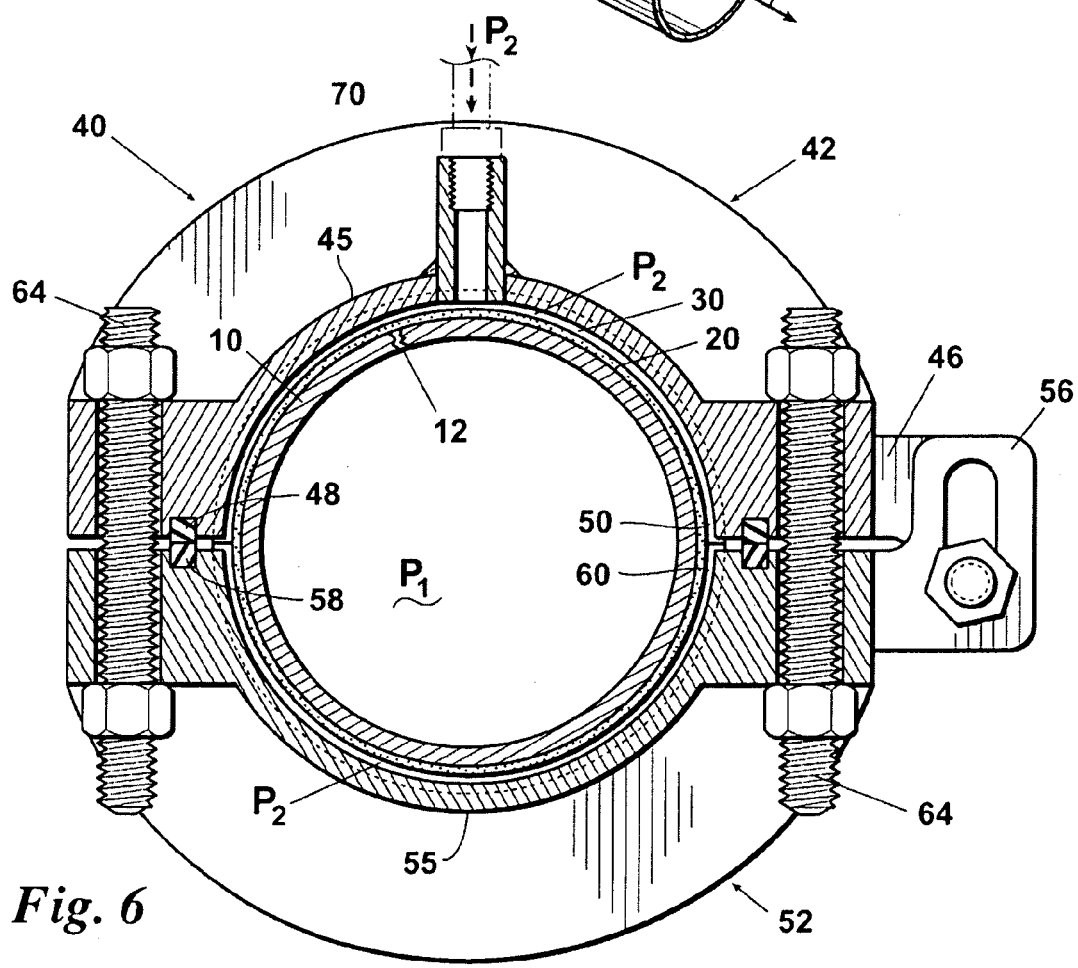

COMPOSITE LOAD TRANSFERRING TECHNIQUE

REFERENCE TO PENDING APPLICATIONS

This application is not based upon any pending domestic or international patent applications.

FIELD OF THE INVENTION

This invention relates generally to the field of piping and pipeline repair systems. More particularly, the present invention relates to the use of composite materials in providing a piping and pipeline repair system.

BACKGROUND OF THE INVENTION

Piping systems and pipelines are subject to defects such as, arc burns, corrosion, cracks, dents, fretting, gouges, and grooves that compromise structural integrity. (A person of ordinary skill in the art would recognize that a composite load transferring technique according to this invention is equally applicable to piping as it is to pipeline. Rather than use terms such as "pipeline/piping" or "pipeline/piping system" throughout this disclosure, pipeline is used instead.) Because of the potential of a defect to cause catastrophic failure, pipeline operators employ various external and internal inspection methods to evaluate pipeline conditions and identify defects. When a defect is identified, various repair methods are employed based upon such factors as defect location, type, and size. Repair methods include grinding, weld deposit, sleeves, clamps, and hot tapping. Preferably, operators would like to make the repair without having to shutdown or reduce the flow of the pipeline.

An advance in sleeve-type repairs has been the use of composite materials. The composite is typically multiple layers of carbon, glass, or aramid fibers bound together by a polymeric matrix consisting of either epoxy, polyurethane, or vinlyester in the form of a patch or wrap. First, the surrounding pipeline surfaces are prepared to receive the composite wrap and filler by grit-blasting or an equivalent process. In a typical repair, putty filler is used to fill any voids in the pipeline created by the defect and to taper uneven welds or misaligned pipes. The surface is then prepared with low viscosity polymeric primer to ensure bonding and load transfer between the repair and the substrate. The structural reinforcing fibers, or fabric, are then saturated with a liquid polymer and the wet fibers are wrapped around the outer pipeline surface. The wrap is then allowed to cure at ambient temperature and atmospheric pressure.

Composite wrap repairs can be difficult and labor intensive due in part to the handling of the wet fibers and the time-sensitive nature of the liquid polymer. As the polymer set-up time or pot life expires, the liquid polymer becomes more viscous and difficult to mold and shape. Unlike cure time, which may be a day or several days, the pot life of many liquid polymers is only a few minutes. One method for addressing the pot life problem is to apply dry fabric to the pipeline surface and then optionally enclose the fabric with a vented clamp, sleeve or shell into which liquid polymer is injected. (See U.S. Pat. No. 7,387,138, issued to Rice et al., Jun. 17, 2008) (hereinafter, "the '138 patent").

Other types of composite wrap systems include a pre-impregnated system and pre-cured coil. A pre-impregnated system is one that has a polymer applied onto the fibers at the factory; however, the polymer is not fully cured at this stage. Reaction of the polymer is achieved by the addition of heat or a chemical (including water) to the pre-impregnated fiber. This means that a liquid polymer is applied to dry fibers at a factory and the reaction is suspended until heat or some type of chemical is added to the system once it is applied to the pipeline.

In a pre-cured coil, the repair system is shipped from the factory with the polymer completely reacted onto the fibers. Each layer of the repair system is therefore pre-cured and is pre-formed to the pipeline outer diameter. In the field, this pre-cured coil is pulled around the pipeline and an adhesive is applied to each layer to bond the coil together.

The condition of current composite systems is such that pipeline stresses are only shared above the internal pipeline pressure at which the wrap was applied. It is not, however, practical to lower pressure near or to ambient conditions during curing to obtain maximum load transfer. When pipeline pressure is increased, the wrap will begin to share the load with the pipeline once the pipeline wall expands to the diameter at which the composite wrap was installed. For example, the '138 patent does not equalize the pressure in the shell's cavity with that of the pipeline pressure when injecting the liquid polymer into the cavity. Rather, the pressure applied is the pressure effective for obtaining polymer impregnation of the dry fabric and displacing any entrapped air in the cavity. The shell is "sealed" only to the extent needed to contain the liquid polymer and allow it to effectively impregnate the fabric. Therefore, a need exists to provide conditions under which the composite cures while the pipeline is operating but reduce the diameter of the pipeline as if the pipeline pressure had been reduced below operating pressure.

BRIEF SUMMARY OF THE INVENTION

A method for repairing and reinforcing a pipeline includes covering a defect in a pipeline section with a composite wrap, isolating and equalizing a pressure on the wrap with that of the pipeline section, and allowing the composite wrap to effectively cure. The composite wrap is preferably a fiber reinforced polymer capable of providing reinforcement in the hoop and axial directions.

Isolating the composite wrap from the ambient environment is preferably accomplished by a housing. The housing provides an internal cavity that accommodates the wrapped pipeline section and preferably substantially conforms to the geometrical configuration of the wrapped pipeline section. In the case of a cylindrical pipeline section, the housing is preferably a repair clamp. A compressive force is applied to the external surface of the composite wrap residing within the cavity so that the pressure acting on the surface of the wrap is at least equal to the pressure of the pipeline section. Providing this compressive force allows the wrap to cure on the pipeline as if the pipeline is at zero pressure. The housing may be provided with a fitting so that a pressurized gas or liquid may provide the compressive force.

Once the wrap has effectively cured, the compressive force may be relieved by venting the gas or liquid. The housing may then be removed, thereby exposing the composite to the ambient environment. The composite is now under load and is immediately sharing load with the pipeline.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 1 is a view of a pipeline section containing a product flow and having a defect in a portion of pipeline wall.

FIG. 2 is a view of the pipeline section containing the defect and being encompassed by a composite wrap.

FIG. 6 is a view taken along section line 6-6. A cavity is formed by an exterior surface of the composite wrap and an upper and lower interior surface of the repair clamp. Pressurized gas or liquid may be introduced into the cavity or released from the cavity through a fitting located on the repair clamp.

DETAILED DESCRIPTION OF THE PREFERRED EMBODIMENTS

Figure 3:
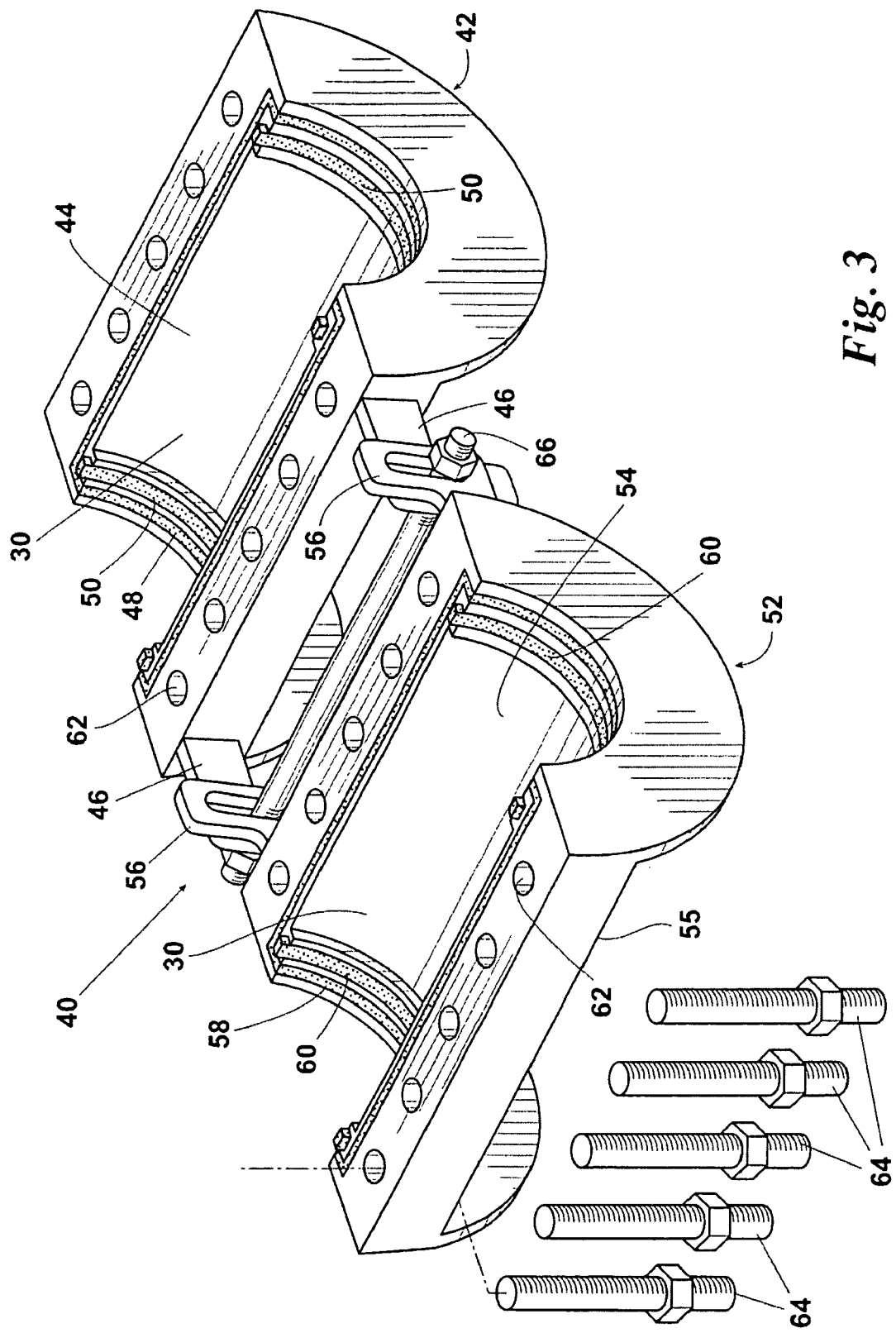
FIG. 3 is a view of a pipeline repair clamp capable of sealing the exterior surface of the composite wrap from the ambient environment.

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation. Elements in the drawings are numbered as follows:

10 Pipeline
12 Pipeline defect
14 Product flow
20 Composite wrap
30 Cavity
40 Repair clamp
42 Upper member
44 Inner surface
46 Hinge member
48 Insulation
50 Seal
52 Lower member
54 Inner surface
56 Hinge member
58 Insulation
60 Seal
62 Bolt hole
64 Stud
66 Hinge stud
70 Fitting Referring now to FIGS. 1 and 2, a pipeline 10 contains a pressurized product flow 14 that exerts an outward radial pressure on an interior surface of pipeline 10. Arc burns, corrosion, cracks, dents, fretting, gouges, or grooves create a defect 12 that compromises the integrity of pipeline 10 and represents a potential failure point. A pipe wrap 20, preferably composed of a bi-directional fiber and epoxy system, is wrapped about pipeline 10 so that defect 12 is completely enclosed by wrap 20. A composite wrap sold by TDW, Tulsa, Okla., under the trademark RES-Q™ provides a suitable fiber and epoxy system.

Figure 4:
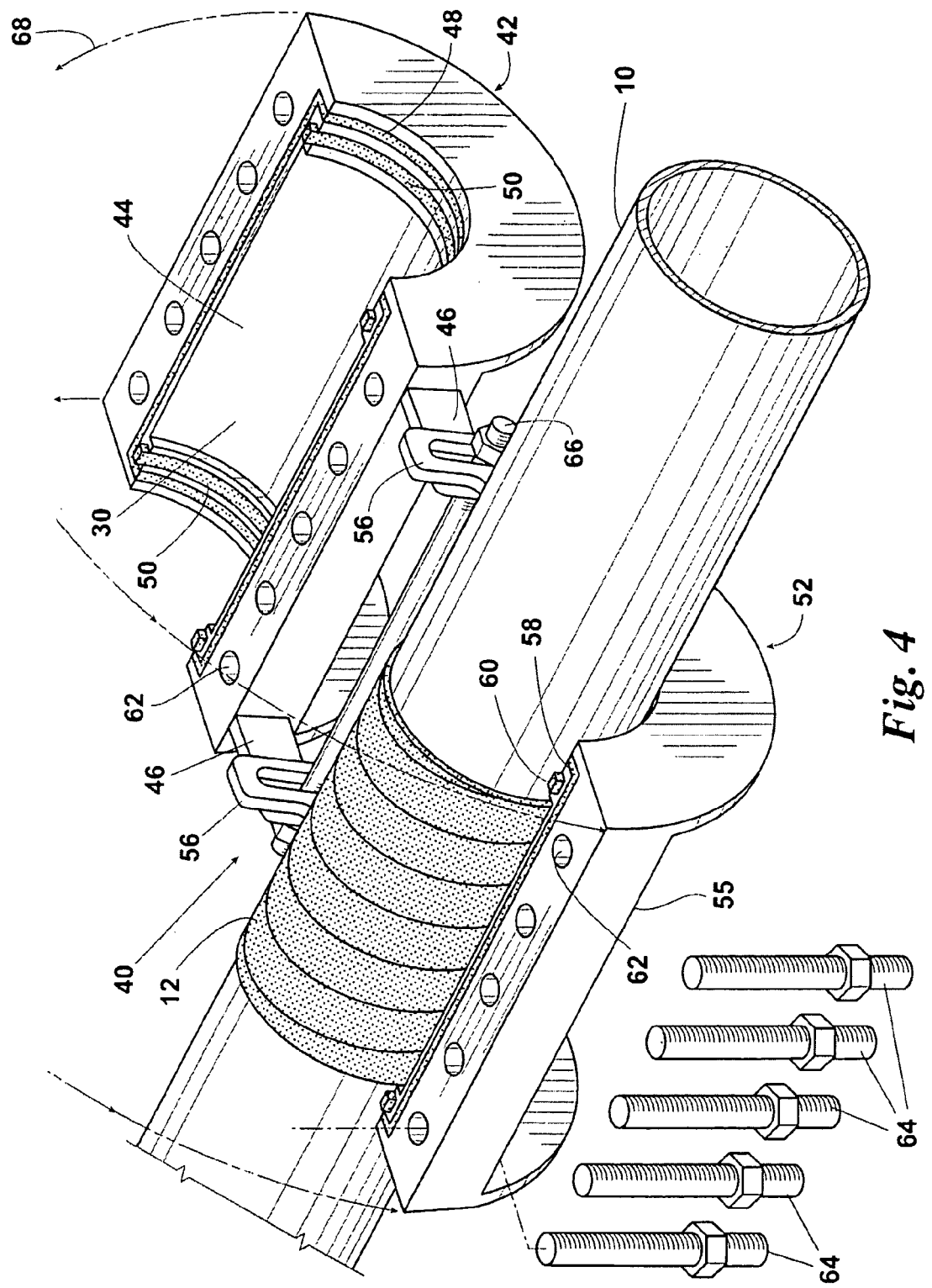
FIG. 4 is a view of the repair clamp in an open position and centered relative to a wrapped section of the pipeline.
Figure 5:
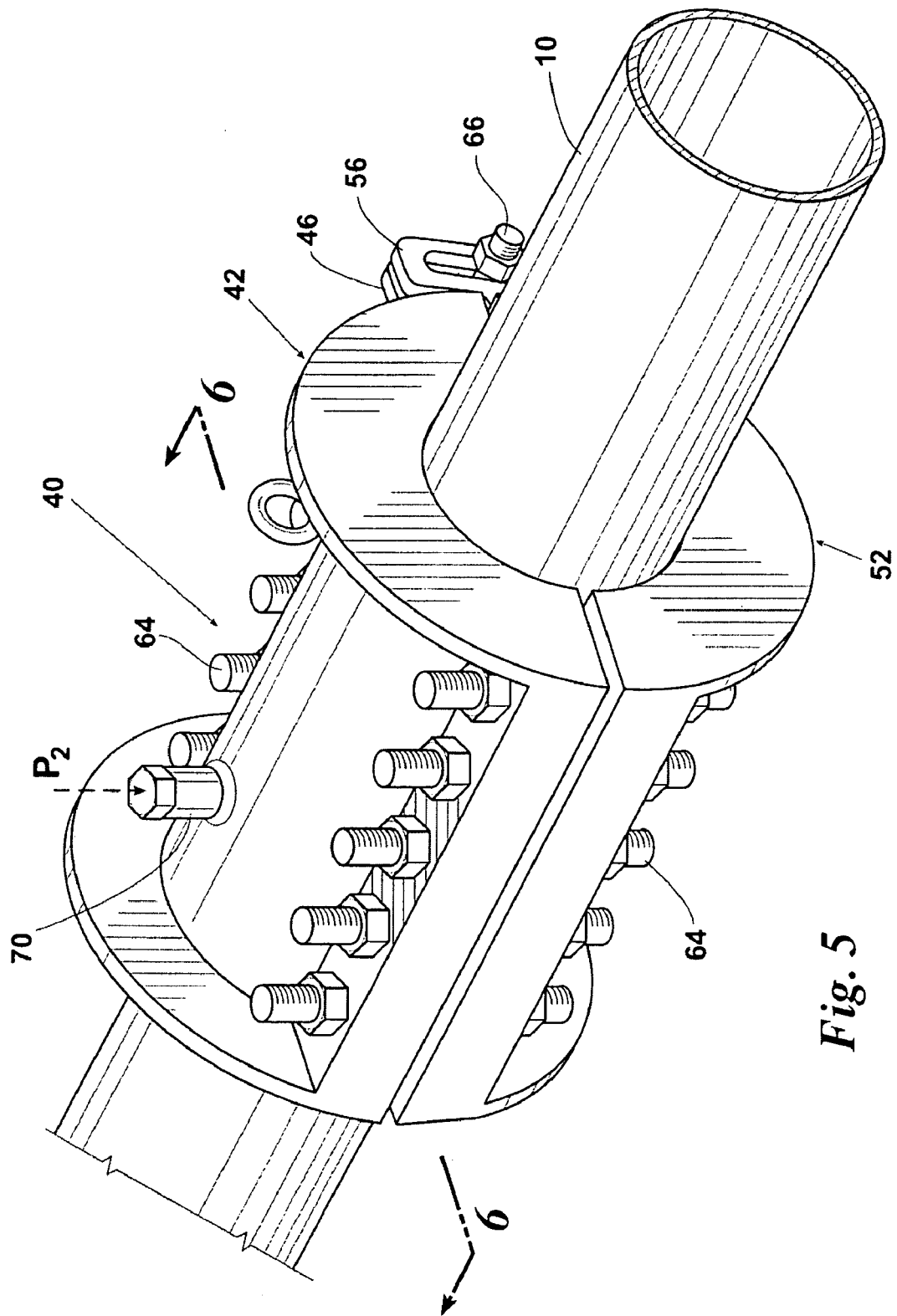
FIG. 5 is a view of the repair clamp in a closed position, thereby isolating the wrapped section from the ambient environment.

Referring now to FIGS. 3 to 5, a housing 40, preferably in the form of a hinged, split sleeve repair clamp isolates an external surface of wrap 20 from an ambient atmosphere. Housing 40 may also be of another type, such as a steel sleeve and grip clamp configuration. The hinge is provided to aid in handling and is not an integral part of the pressure containing system described herein. Other configurations of housings may be used to accommodate more complex pipeline geometries such as branches, tees, elbows, valve boxes, and reducers. Repair clamp 40 is of a type well-known in the art and typically used for the permanent or temporary repair of a pipeline. Leak repair clamps like those sold by T.D. Williamson, Inc., Tulsa, Okla., provide a suitable repair clamp.

In a preferred embodiment, an upper containment member 42 having a hinge member 46 and a lower containment member 52 having a hinge member 56 are positioned about wrap 20 so that wrap 20 lies between a set of seals 50 and 60. A set of insulating cords 48, 58 provides for heat insulation about the perimeter of repair clamp 40. Seals 50 and 60 are preferably comprised of Neoprene, Buna-N, or VITON®. The seal arrangement is representative; a composite load transferring technique according to this invention is not concerned with the specific seal arrangement. Upper containment member 42 pivots about hinge stud 66 in direction 68. Flange surfaces of upper containment member 42 then mate with opposing flange surfaces of lower containment member 52. The flange surfaces have bolt holes 62 that receive a stud 64. Once studs 64 are properly tightened, inner surfaces 44 and 54 form a cavity 30 about wrap 20 and wrap 20 is effectively sealed from an ambient atmosphere. Cavity 30 preferably substantially conforms to the geometry of the wrapped section. A polymer film (not shown) may be used to assist in the installation process so that the epoxy does not stick to the inner surfaces 44, 54.

Referring now to FIG. 6, a fitting 70 may be used to inject a pressurized gas or liquid into cavity 30 so that the compressive force applied by cavity 30 to wrap 20 results in a pressure P2 that is equal to or greater than a pressure P1 acting on the interior surfaces of pipeline 10. Fitting 70 may also be configured to relieve pressure P2 to arrive at a desired pressure. Wrap 20 then cures as if the pipeline is at zero pressure. Because wrap 20 has effectively cured under a compressive force, it immediately shares a load with pipeline 10 once clamp 40 is removed. Although defect 12 is shown as extending into an interior of pipeline 10, preferably defect 12 represents a non-through-wall defect. The finished pipeline 10 appears as in FIG. 2 with clamp 40 removed.

While a composite load transferring technique has been described with a certain degree of particularity, many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method for repairing and reinforcing a pipeline containing a pressurized product flow, the method comprising the steps of:
   (i) first, covering a defect in a pipeline section with a composite wrap, the composite wrap being in an uncured state;
   (ii) second, isolating an external surface of the uncured composite wrap from an ambient environment;
   (iii) third, applying a compressive force to the external surface of the uncured composite wrap, the compressive force producing a pressure on the external surface of the isolated and uncured composite wrap of at least equal to the pressure of the pressurized product flow; and (iv) fourth, allowing the uncured composite wrap to cure while under the compressive force.

2. A method according to claim 1, said isolating step comprising a housing capable of effectively sealing off an interior surface of the housing from the ambient environment.

3. A method according to claim 2, the housing comprising a repair clamp.

4. A method according to claim 2 further comprising a cavity, the cavity being formed by an exterior surface of the composite wrap and the interior surface of the housing.

5. A method according to claim 4, the housing comprising a fitting in communication with the cavity.

6. A method according to claim 4 wherein a polymer film is disposed between the interior surface of the housing and the exterior surface of the composite wrap.

7. A method according to claim 1, the compressive force resulting in a pressure on the external surface of the composite wrap at least substantially equal to a pressure within the pipeline.

8. A method according to claim 7, the compressive force comprising at least one of a gas and a liquid.

9. A method according to claim 1 further comprising the step of relieving the compressive force exerted upon an exterior surface of the composite wrap.

10. A method according to claim 9, said relieving step comprising exposing the external surface of the composite wrap to the ambient environment.

11. A method according to claim 10, said relieving step further comprising complete removal of the housing.

12. A method according to claim 1, the pipeline section being selected from at least one of the group consisting of a uniform geometrical section and a non-uniform geometrical section.

13. A method according to claim 1 further comprising the step of preparing a surface of the pipeline section for the composite wrap.

14. A method according to claim 1 further comprising the step of preparing the composite wrap for application to the pipeline section.

15. A method according to claim 1, the composite wrap comprising a fiber material and a polymer matrix, said fiber material being selected from the group consisting of carbon, glass, aramid, and a mixture thereof, said polymer matrix selected from the group consisting of epoxy, polyurethane, vinylester, polyurea, and cyanate ester.

16. A method according to claim 1, the composite wrap comprising a pre-impregnated composite wrap.

17. A method according to claim 1 wherein the pipeline section is a portion of a piping system.

18. A method for repairing and reinforcing a pipeline section having a pressurized product flow therein, the method comprising the steps of:

(i) first, covering a defect in a pipeline section with an uncured composite wrap;

(ii) second, sealably enclosing an external surface of the composite wrap with an enclosure effective for maintaining a pressure on the external surface at least substantially equal to the pressure of the pressurized product flow;

(iii) third, pressurizing the enclosure to the pressure of the pressurized product flow with at least one of a gas and a liquid;

(iv) fourth, allowing the composite wrap to cure while under the pressure; and (v) fifth, relieving the pressure on the cured composite wrap;

wherein the cured composite wrap after said relieving step is substantially immediately sharing load with the pipeline section.

19. A method according to claim 18 further comprising the step of maintaining the pressure within the enclosure during an effective cure time for the composite wrap.

* * * * *